(12) United States Patent
Yoon et al.

(10) Patent No.: US 10,358,178 B2
(45) Date of Patent: Jul. 23, 2019

(54) TRACK ASSEMBLY FOR TRACKED VEHICLE

(71) Applicant: JINSUNG INDUSTRY CO., LTD., Pyungtaek-si, Gyeonggi-do (KR)

(72) Inventors: Woo Seok Yoon, Seoul (KR); Sung Soo Yoon, Seoul (KR)

(73) Assignee: JINSUNG INDUSTRY CO., LTD., Pyungtaek-si (KR)

( * ) Notice: Subject to any disclaimer, the term of this patent is extended or adjusted under 35 U.S.C. 154(b) by 108 days.

(21) Appl. No.: 15/563,496

(22) PCT Filed: Mar. 30, 2016

(86) PCT No.: PCT/KR2016/003267
§ 371 (c)(1),
(2) Date: Sep. 29, 2017

(87) PCT Pub. No.: WO2016/159657
PCT Pub. Date: Oct. 6, 2016

(65) Prior Publication Data
US 2018/0086398 A1    Mar. 29, 2018

(30) Foreign Application Priority Data

Mar. 31, 2015 (KR) .................. 10-2015-0045427

(51) Int. Cl.
*B62D 55/18* (2006.01)
*B62D 55/32* (2006.01)
(Continued)

(52) U.S. Cl.
CPC .......... *B62D 55/18* (2013.01); *B62D 55/092* (2013.01); *B62D 55/15* (2013.01); *B62D 55/20* (2013.01);
(Continued)

(58) Field of Classification Search
CPC ........ B62D 55/18; B62D 55/15; B62D 55/20; B62D 55/092; B62D 55/32; G01K 13/02; G01K 2013/026; G01M 17/03; G01D 5/12; G01P 15/165

USPC .......................................................... 305/117
See application file for complete search history.

(56) References Cited

U.S. PATENT DOCUMENTS

| 2,641,006 A * | 6/1953 | Lipton .................... A43B 3/14 12/142 D |
| 6,874,859 B1 | 4/2005 | Duse |

(Continued)

FOREIGN PATENT DOCUMENTS

| JP | 2003-40160 A | 2/2003 |
| JP | 2003040160 A * | 2/2003 |

(Continued)

*Primary Examiner* — S. Joseph Morano
*Assistant Examiner* — Jean W Charleston
(74) *Attorney, Agent, or Firm* — Birch, Stewart, Kolasch & Birch, LLP

(57) ABSTRACT

The present invention relates to a track assembly for a tracked vehicle, which, particularly, comprises: a support shaft disposed to be orthogonal to a traveling direction of a work body; a connecting collar for connecting the support shaft to the work body while supporting both ends of the support shaft; a rotary roller fitted on the outer periphery of the support shaft and rotating while supporting the inner peripheral surface of a track; a first detection unit disposed between the support shaft and the rotary roller to measure the number of rotations of the rotary roller or the acceleration thereof; a second detection unit for measuring the temperature of a lubricant applied between the support shaft and the rotary roller; a third detection unit disposed on the rotary roller to measure a wear state of the rotary roller; and a communication unit for communicating, to the outside, a result value measured by the first detection unit or the third detection unit. Therefore, the track assembly can improve the efficiency and reliability of work.

10 Claims, 5 Drawing Sheets

(51) Int. Cl.
*B62D 55/092* (2006.01)
*B62D 55/20* (2006.01)
*G01D 5/12* (2006.01)
*G01K 13/02* (2006.01)
*G01M 17/03* (2006.01)
*B62D 55/15* (2006.01)
*G01P 15/16* (2013.01)

(52) U.S. Cl.
CPC ............... *B62D 55/32* (2013.01); *G01D 5/12* (2013.01); *G01K 13/02* (2013.01); *G01M 17/03* (2013.01); *G01K 2013/026* (2013.01); *G01P 15/165* (2013.01)

(56) References Cited

U.S. PATENT DOCUMENTS

| | | |
|---|---|---|
| 2012/0056473 A1 | 3/2012 | Hashimoto et al. |
| 2013/0082846 A1 | 4/2013 | McKinley et al. |
| 2013/0255354 A1 | 10/2013 | Hawkins et al. |
| 2014/0077587 A1* | 3/2014 | Smith ................... B63B 59/10 305/15 |
| 2015/0066291 A1 | 3/2015 | Johannsen et al. |
| 2015/0081166 A1* | 3/2015 | Diekevers ............. B62D 55/14 701/34.4 |
| 2015/0361534 A1* | 12/2015 | Amada .................. B62D 55/21 305/201 |

FOREIGN PATENT DOCUMENTS

| | | | |
|---|---|---|---|
| JP | 2003-525169 A | | 8/2003 |
| JP | 2010-274872 A | | 12/2010 |
| JP | 2011-11622 A | | 1/2011 |
| JP | 2011-11623 A | | 1/2011 |
| JP | 2014-529024 A | | 10/2014 |
| KR | 10-2002-0054621 A | | 7/2002 |
| KR | 10-2014-0087136 A | | 7/2014 |
| KR | 10-20120155225 A | * | 9/2014 |

* cited by examiner

TRACK ASSEMBLY FOR TRACKED VEHICLE

CROSS REFERENCE TO RELATED APPLICATIONS

This application is the National Phase of PCT International Application No. PCT/KR2016/003267, filed on Mar. 30, 2016, which claims priority under 35 U.S.C. 119(a) to Patent Application No. 10-2015-0045427, filed in the Republic of Korea on Mar. 31, 2015, all of which are hereby expressly incorporated by reference into the present application.

TECHNICAL FIELD

The present invention relates to a track assembly for a tracked vehicle, and more particularly, to a track assembly for a tracked vehicle which can improve the efficiency and reliability of work by enabling a manager to accurately monitor and check on the current status of the tracked vehicle from a distance and to know when to fill it with oil or when to replace parts.

BACKGROUND ART

Generally, a base carrier I of a tracked vehicle is used on agricultural or construction vehicles such as excavators and bulldozers and military vehicles such as tanks and armored vehicles.

The base carrier of the tracked vehicle includes a chain belt acting as wheels, a traveling speed reducer rotatably supporting the chain belt, a carrier roller, a track roller, and an idler. The traveling speed reducer, carrier roller, and idler are disposed on the inside of the chain belt to rotatably support the chain belt.

The traveling speed reducer is a driving apparatus that rotatably supports the front of the chain belt and reduces the torque of the engine of the tracked vehicle to rotate the chain belt.

When the chain belt rotates by the torque of the traveling speed reducer, the carrier roller rotatably supports the top of the chain belt, the track roller rotatably supports the bottom of the chain belt, and the idler rotatably supports the rear of the chain belt opposite the side where the traveling speed reducer is disposed.

However, with the tracked vehicle constructed as above according to the conventional art, an operator on site is unable to check the vehicle's status while driving, so the operator has to stop operating and check on the vehicle's status only when a problem occurs during operation, or needs to ask for after-sales repair service if they find something wrong with its parts by checking on the vehicle's status after completion of an operation.

Thus, the operator will continue operating even with the possibility that the vehicle can go wrong, and becomes able to get necessary repairs only after something actually goes wrong.

DISCLOSURE

Technical Problem

The present invention has been made in an effort to solve the aforementioned technical problems and to provide a track assembly for a tracked vehicle which can improve the efficiency and reliability of work by enabling an operator or a manager to check the current status of the tracked vehicle in real time, while seated in the vehicle or remotely from an on-site office.

Technical Solution

A preferred embodiment of the present invention provides a track assembly for a tracked vehicle, comprising: a support shaft disposed to be orthogonal to a traveling direction of a work body; a rotary roller fitted on the outer periphery of the support shaft and rotating while supporting the inner side of a chain belt; a first detection unit disposed between the support shaft and the rotary roller to measure either the number of rotations of the rotary roller or the acceleration thereof; a second detection unit for measuring the temperature of a lubricant applied between the support shaft and the rotary roller; and a third detection unit disposed on the rotary roller to measure a wear state of the rotary roller.

The track assembly for a tracked vehicle may further comprise a communication unit for communicating, to the outside, result values measured by the first to third detection units.

Furthermore, the first detection unit may comprise: a magnet that is attached to a part of the inner peripheral surface of the rotary roller exposed toward the support shaft and rotates in tandem with the rotary roller; and a hall sensor that is attached to the support shaft, corresponding to the rotational pathway of the magnet, and senses the magnetism of the magnet.

Furthermore, a bushing may be interposed between the support shaft and the rotary roller, and the first detection unit may comprise: a magnet that is attached to a part of the inner peripheral surface of the rotary roller not facing the bushing and rotates in tandem with the rotary roller; and a hall sensor that is attached to either the support shaft or the connecting collar, corresponding to the rotational pathway of the magnet, and senses the magnetism of the magnet.

Furthermore, a lubricant reservoir filled with a lubricant may be further provided between the support shaft and the rotary roller, and the second detection unit may be a temperature sensor that is disposed to be exposed to the lubricant reservoir.

Furthermore, the third detection unit may be a contact sensor that is disposed to be hidden at a predetermined depth from the outer peripheral surface of the rotary roller.

Furthermore, the third detection unit may be a conducting wire, which may be configured in such a way as to detect wear when the rotary roller wears out to the predetermined depth and wire breakage occurs.

Furthermore, a plurality of third detection units may be provided at different depths from the outer peripheral surface of the rotary roller.

Furthermore, the communication unit may comprise: a first communication line outputting result values from the first detection unit and the second detection unit; and a second communication line outputting a result value from the third detection unit.

Furthermore, the track assembly may further comprise a reception unit for receiving the result values output from the communication unit via wireless communication.

Advantageous Effects

According to a track assembly for a tracked vehicle according to a preferred embodiment of the present invention, the following effects can be obtained:

First, it is possible to monitor the traveling distance or driving situation of the tracked vehicle in real time by detecting at least one between the acceleration and number of rotations between the rotary roller and the support shaft through a first detection unit.

Second, it is possible to check for lubricant leakage and partial wear on a bushing interposed between the rotary roller and the support shaft by detecting a change in the temperature of a lubricant filled between the rotary roller and the support shaft through a second detection unit.

Third, it is possible to check the residual life of the rotary roller by detecting a wear state of the rotary roller through a third detection unit.

Fourth, it is possible to improve the efficiency and reliability of work by sending out detected values obtained through the above-described first to third detection units to an operator seated in the tracked vehicle or a manager stationed in an on-site office.

BEST MODE FOR CARRYING OUT THE INVENTION

Hereinafter, a track assembly for a tracked vehicle according to a preferred embodiment of the present invention will be described in detail with reference to the accompanying drawings.

Figure 1:
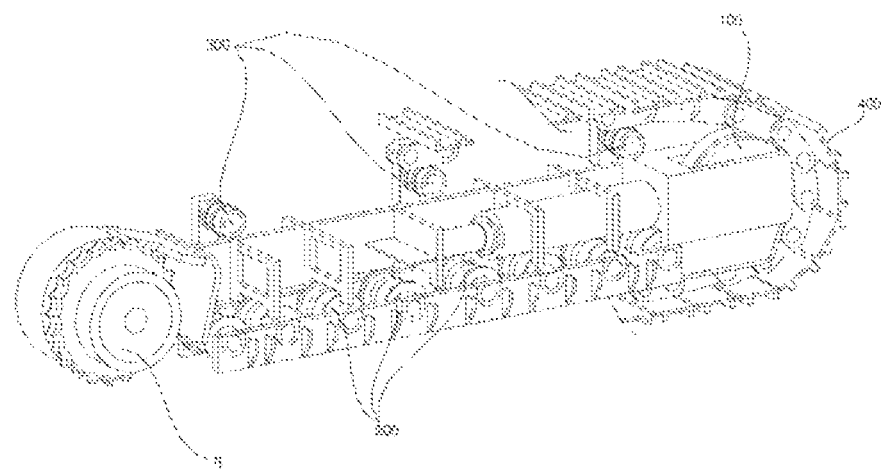
FIG. 1 is a side view of components of a track assembly for a tracked vehicle, including an idler with a rotary roller, a track roller, and a carrier roller, according to a preferred embodiment of the present invention.
Figure 2A:
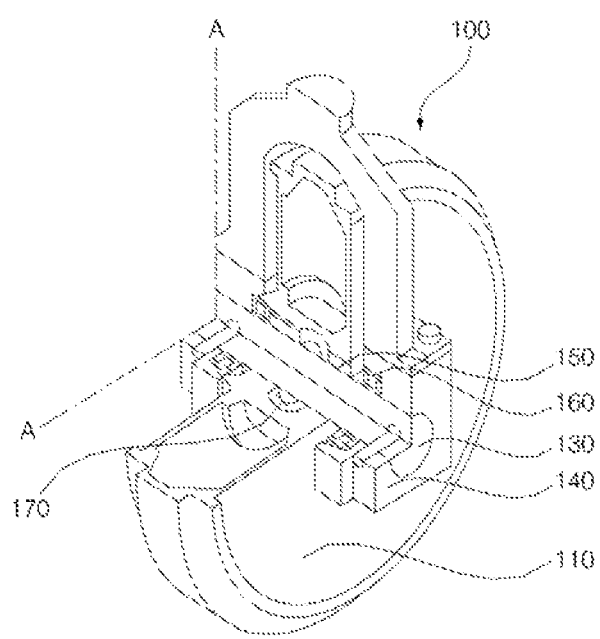
FIGS. 2a to 2c are partial cutaway perspective views of the idler, track roller, and carrier roller of FIG. 1.
Figure 2B:
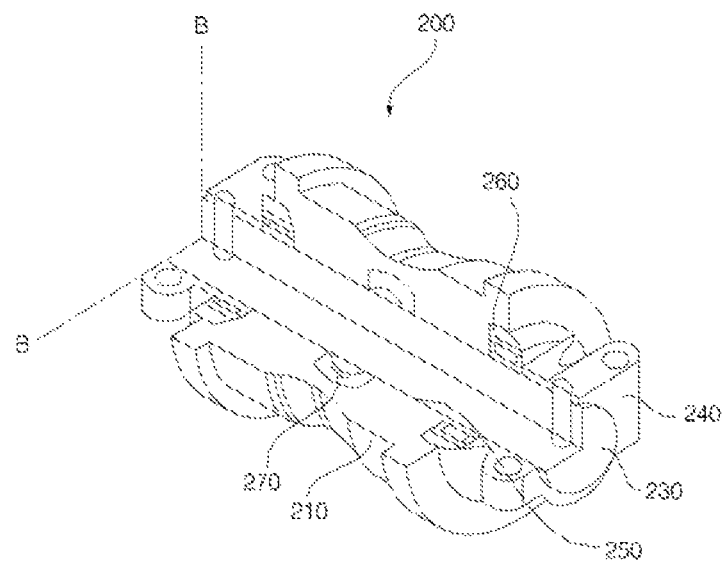
Figure 2C:
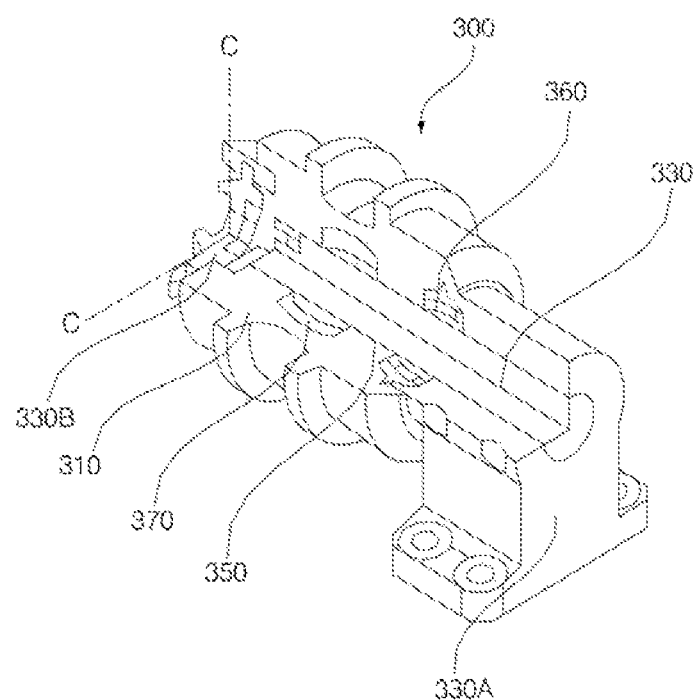
Figure 3:
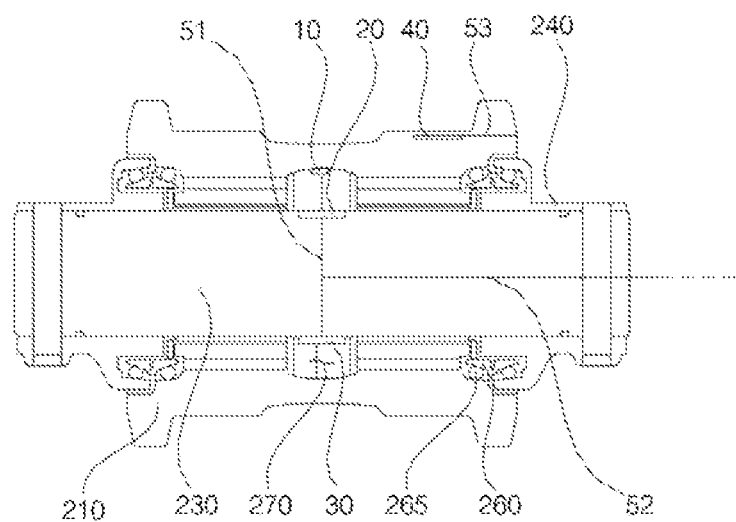
FIG. 3 is a cross-sectional view of the track roller of FIG. 2.
Figure 4:
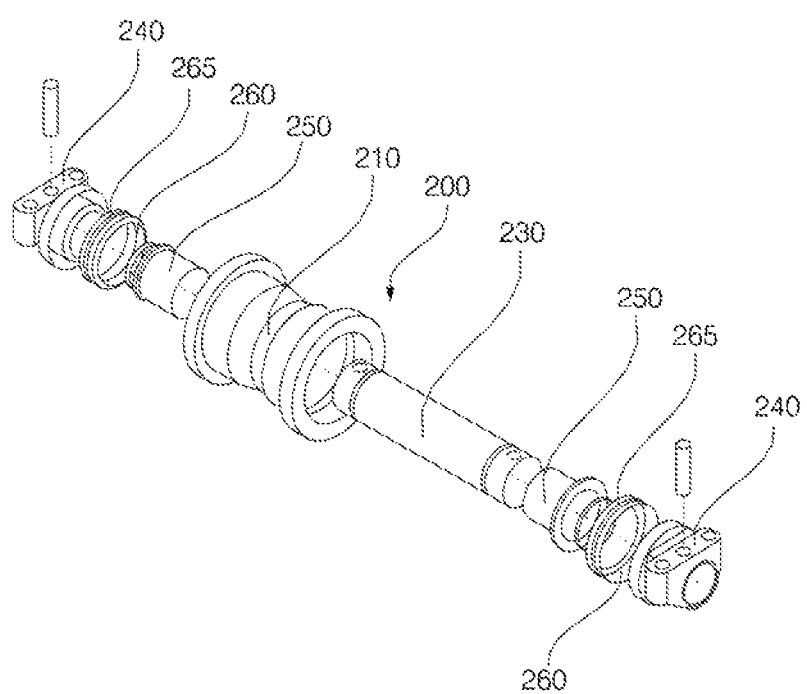
FIG. 4 is an exploded perspective view of the track roller of FIG. 2.

FIG. 1 is a side view of components of a track assembly for a tracked vehicle, including an idler with a rotary roller, a track roller, and a carrier roller, according to a preferred embodiment of the present invention. FIGS. 2a to 2c are partial cutaway perspective views of the idler, track roller, and carrier roller of FIG. 1. FIG. 3 is a cross-sectional view of the track roller of FIG. 2. FIG. 4 is an exploded perspective view of the track roller of FIG. 2.

Referring to FIGS. 2a to 2c, a track assembly for a tracked vehicle according to a preferred embodiment of the present invention comprises a support shaft 130, 230, and 330 disposed to be orthogonal to a traveling direction of a work body 1, a connecting collar 140, 240, and 340 for connecting the support shaft 130, 230, and 330 to the work body 1 while supporting both ends of the support shaft 130, 230, and 330, and a rotary roller 110, 210, and 310 fitted on the outer periphery of the support shaft 130, 230, and 330 and rotating while supporting the inner peripheral surface of a chain belt 400.

Also, the track assembly for the tracked vehicle according to the preferred embodiment of the present invention may further comprise a first detection unit 10 and 20 disposed between the support shaft 130, 230, and 330 and the rotary roller 110, 210, and 310 to measure the number of rotations of the rotary roller 110, 210, and 310 or the acceleration thereof, a second detection unit 30 for measuring the temperature of a lubricant applied between the support shaft 130, 230, and 330 and the rotary roller 110, 210, and 310, a third detection unit 40 disposed on the rotary roller 110, 210, and 310 to measure a wear state of the rotary roller 110, 210, and 310, and a communication unit 50 for communicating, to the outside, result values measured by the first to third detection units 10 and 20 to 40.

Generally, the components of a base carrier I of the tracked vehicle that support the inner peripheral surface of the chain belt 400 and have the aforementioned support shaft 130, 230, and 330, connecting collar 140, 240, and 340, and rotary roller 110, 210, and 310 as common components may include the idler 100 referred to in FIGS. 1 and 2a, the track roller 200 referred to in FIGS. 1 and 2b, and the carrier roller 300 referred to in FIGS. 1 and 2C.

Hereinafter, the aforementioned idler 100, track roller 200, and carrier roller 300 will be described in detail, and the support shafts 130, 230, and 330, the connecting collars 140, 240, and 340, and the rotary rollers 110, 210, and 310, which are accepted as performing their same respective functions, will be labeled as first, second, and third to identify them.

Referring to FIG. 1. the base carrier I of the tracked vehicle includes a chain belt 400 acting as wheels, a traveling speed reducer 8 rotatably supporting the chain belt 400, and the aforementioned idler 100, track roller 200, and carrier roller 300. The traveling speed reducer 8, idler 100, track roller 200, and carrier roller 300 are disposed on the inner side of the chain belt 400 so that one or multiple of them rotatably support the chain belt 400.

The traveling speed reducer 8 is a driving apparatus that rotatably supports the front of the chain belt 400 and reduces the torque of the engine (not shown) of the tracked vehicle to rotate the chain belt 400.

When the chain belt 400 rotates by the torque of the traveling speed reducer 8, the idler 100 rotatably supports the rear of the chain belt 400, the track roller 200 rotatably supports the bottom of the chain belt 400, and the carrier roller 300 rotatably supports the top of the chain belt 400.

First, referring to FIGS. 1 and 2a, the idler 100 is provided in such a way that the first rotary roller 110 rotates about the first support shaft 130, and the first support shaft 130 is connected to the work body 1 via a connecting means 120.

The first support shaft 130 is horizontally disposed to be orthogonal to a traveling direction of the base carrier I, and the first rotary roller 110 rotates about the first support shaft 130 while supporting the inner side of the front of the chain belt 400.

The first connecting collar 140 for connecting the first support shaft 130 to the connecting means 120 is provided at two ends thereof to prevent impurities from entering the first support shaft 130. The first rotary roller 110 may be fitted and attached on one side of the first support shaft 130 while the first connecting collar 140 of one of the two ends of the first support shaft 130 is not fastened. However, it should be noted that the method of fastening the first rotary roller 110 to the first support shaft 130 is not limited to the above-described fastening method.

Here, a bushing 150 may be interposed between the first support shaft 130 and the first rotary roller 110. The bushing 150 acts like a rotary support bearing that supports the rotation of the first rotary roller 110 with respect to the fixed first support shaft 130.

A pair of floating seals 160 may be closely affixed to a region where the first support shaft 130, the first rotary shaft 110, and the first connecting collar 140 are adjacent to each other, thereby preventing the lubricant from leaking out or impurities from entering from the outside. The pair of floating seals 160 are individually provided on the inside of the above-described first connecting collar 140 with respect to the first support shaft 130. Seal rings (see reference numeral "265" of FIG. 3) are individually interposed on the outer peripheral surface of the pair of floating seals 160 to prevent lubricant leakage and impurity penetration.

The aforementioned bushing 150 may be interposed in the space between the first support shaft 130 and the first rotary roller 110, and may include a lubricant reservoir 170 for storing the lubricant to reduce wear on the bushing 150 and allow for smooth rotation of the first rotary roller 110. The lubricant reservoir 170 may be provided between the first support shaft 130 and the first rotary roller 110; otherwise, it may be provided in such a way as to have a predetermined space for storing a considerable amount of lubricant at the middle and supply it to the left and right ends of the first support shaft 130, in order to ensure an overall uniform supply of oil.

Next, referring to FIGS. 1 and 2*b*, the track roller 200 has practically the same components as the idler 110, except for their names and functions.

More particularly, the track roller 200 comprises a second support shaft 230 disposed in the same direction as the first support shaft 130, a second rotary roller 210 rotating about the second support shaft 230, and a second connecting collar 240 disposed on both ends of the second support shaft 230, and includes a bushing 250, a pair of floating seals 260, seal rings 265, and a lubricant reservoir 270, like the idler 100.

Moreover, referring to FIGS. 1 and 2*c*, it can be seen that the carrier roller 300 has practically the same components as the idler 100 and the track roller 200, except for their names and functions.

More particularly, the carrier roller 300 comprises a third support shaft 330 disposed in the same direction as the first support shaft 130 and second support shaft 230, a third rotary roller 310 rotating about the third support shaft 330, and a third connecting collar 340 disposed on both ends of the third support shaft 330, and includes a bushing 350, seal rings (not shown; see reference numeral "265" of FIG. 3), and a lubricant reservoir 370, like the idler 100 and the track roller 200.

The track assembly for the tracked vehicle according to the preferred embodiment of the present invention is characterized in that a plurality of detection units 10 to 40 are mounted to the idler 100 with the support shaft 130, 230, and 330 and the rotary roller 110, 210, and 310, the track roller 20, and the carrier roller 300, which are the components of the aforementioned base carrier I of the tracked vehicle that are rotatably disposed and support the rotation of the rotating chain belt 400.

Hereinafter, the first to third support shafts 130, 230, and 330, the first to third rotary rollers 110, 210, and 310, the first to third connecting collars 140, 240, and 240, and the other components including the bushings 150, 250, and 250, the pairs of floating seals 160, 260, and 360, and the seal rings 265 are all considered as performing their same respective functions, so they will be commonly termed without using prefixes to identify them.

More specifically, referring to FIG. 3, the first detection unit 10 and 20 is disposed between the support shaft 130, 230, and 330 and the rotary roller 110, 210, and 310 to perform the function of measuring the number of rotations of the rotary roller 110, 210, and 310 or the acceleration thereof.

The second detection unit 30 performs the function of measuring the temperature of a lubricant applied between the support shaft 130, 230, and 330 and the rotary roller 110, 210, and 310.

The third detection unit 40 is disposed on the rotary roller 110, 210, and 310 to perform the function of measuring a wear state of the rotary roller 110, 210, and 310.

Referring to FIG. 3, the first detection unit 10 and 20 may comprise a magnet 10 that is attached to a part of the inner peripheral surface of the rotary roller 210 exposed toward the support shaft 230 and rotates in tandem with the rotary roller 210, and a hall sensor 20 that is attached to the support shaft 230, corresponding to the rotational pathway of the magnet 10, and senses the magnetism of the magnet 10.

The hall sensor 20 serves to sense the number of rotations of the rotary roller 110, 210, and 310 and the acceleration thereof by sensing the magnetism of the magnet 10 provided on the rotating rotary roller 110, 210, and 310.

Since a result value measured by the first detection unit 10 and 20 may be used to calculate the driving speed of the chain belt 400, it serves as an index for predicting or checking the current location of the tracked vehicle on the site of work and the current driving status thereof.

However, the first detection unit 10 and 20 is not necessarily positioned as described above.

That is, the above-described bushing 250 for preventing wear of the support shaft 230 is interposed between the support shaft 230 and the inner peripheral surface of the rotary roller 230, and installing the first detection unit 10 and 20 on the bushing 250 may give rise to a risk that it might be unable to calculate precise values. Accordingly, it is preferable that the magnet 10 is attached to a part of the inner peripheral surface of the rotary roller 210 not facing the bushing 250 to rotate in tandem with the rotary roller 210, and that the hall sensor 20 is attached to either the support shaft 230 or the connecting collar 240, corresponding to the rotational pathway of the magnet 10, to sense the magnetism of the magnet 10.

Meanwhile, referring to FIG. 3, the second detection unit 30 may be disposed to be exposed to the lubricant reservoir 270. Preferably, the second detection unit 30 is positioned in such a way as to directly measure the temperature of oil, i.e., a lubricant. Therefore, like the above-described first detection unit 10 and 20, the second detection unit 30 is desirably positioned in such a way as to directly sense the lubricant stored in the lubricant reservoir 270, rather than measuring the temperature of the lubricant smeared on the space between the inner peripheral surface of the bushing 250 and the outer peripheral surface of the support shaft 230.

If the temperature of the lubricant measured by the second detection unit 30 is at or above a set temperature, it can be presumed that the oil temperature has risen due to oil leakage or partial wear of the bushing 250. Thus, a result value measured by the second detection unit 30 may serve as an index for evaluating the durability of the corresponding part or for determining when to replace parts.

Meanwhile, referring to FIG. 3, the third detection unit 40 may be a contact sensor that is disposed to be hidden at a predetermined depth from the outer peripheral surface of the rotary roller 210.

The rotary roller 110, 210, and 310 is a consumable part that needs to be replaced for overall uniform load distribution between itself and the other rotary rollers when wear occurs to some extent, since it is a part that supports the rotation of the inner peripheral surface of the chain belt 400 and actually wears out.

The third detection unit 40 may be disposed on the rotary roller 110, 210, and 310 and serve as an index for determining the residual life of the currently mounted rotary roller 110, 210, and 310 and when to replace the rotary roller 110, 210, and 310 by measuring a wear state of the rotary roller 110, 210, and 310.

The third detection unit 40 for performing the above function is a conducting wire, which may be configured in such a way that, when the rotary roller 110, 210, and 310 wears out to a predetermined depth or deeper and is exposed externally, its wear state can be detected due to wire breakage caused by contact with the inner side of the chain belt 400.

For example, although not shown in the drawings, a plurality of third detection units 40 may be provided at different depths from the outer peripheral surface of the rotary roller 110, 210, and 310, and when wire breakage occurs to each depth, an operator or a manager may be informed of the current wear state so that they can prepare parts for immediate replacement on site, in case the wear state worsens drastically.

Figure 5:
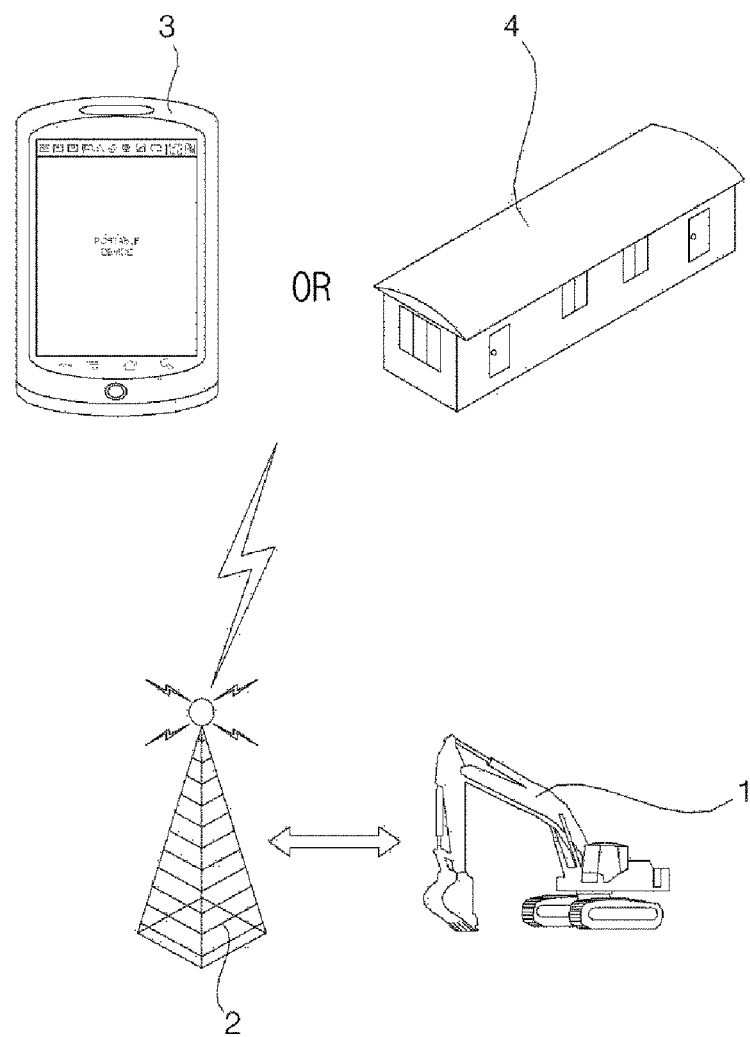
FIG. 5 is a schematic view showing a communication status of the track assembly for the tracked vehicle according to the preferred embodiment of the present invention.

Meanwhile, referring to FIGS. 3 to 5, the communication unit 50 serves to communicate, to the outside, result values measured by the first to third detection units 10 to 40.

Referring to FIG. 3, the communication unit 50 may comprise a first communication line 51 and 52 connected by a line so as to output result values from the first detection unit 10 and 20 and the second detection unit 30, and a second communication line 53 outputting a result value from the third detection unit 40.

Since the first detection unit 10 and 20 and the second detection unit 30 are disposed between the support shaft 230 and the rotary roller 210, as explained previously, they require a line connection, unlike the third detection part 30 provided on the outside of the rotary shaft 23 or rotary roller 210.

The first communication line 51 and 52 may comprise a first connecting line 51 connecting the first detection unit 10 and 20 and the second detection unit 30 and a second connecting line 52 branched from the first connecting line 51 connecting the first detection unit 10 and 20 and the third detection unit 30.

It is needless to say that a transmission unit may be provided for gathering result values output from the first communication line 51 and 52 and the second communication line 53 and sending them to an external mobile communication network or a server.

FIG. 5 is a schematic view showing a communication status of the track assembly for the tracked vehicle according to the preferred embodiment of the present invention.

Meanwhile, the track assembly for the tracked vehicle according to the preferred embodiment of the present invention may further comprise a reception unit for receiving the result values output from the communication unit 50 via wireless communication.

Referring to FIG. 5, the reception unit may be a server that can receive externally via wireless communication, or a base station 2 that can receive via a mobile communication network or satellite communication, or a portable device 3 such as a smartphone with which the operator carries to receive via Bluetooth communication.

Needless to say, the result values from the first to third detection units 10 through 40 that are communicated through the base station 2 may be sent to the manager's computer or monitor in an on-site office 4 to enable the manager to monitor the current status of the tracked vehicle operating on site in real time through a specific computer program or the like. Moreover, the result values from the first to third detection units 10 through 40 that are communicated via Bluetooth communication may be sent directly to the portable device 3 of the operator who is working, seated in the corresponding tracked vehicle, and the operator may monitor the current status of the tracked vehicle in which they are seated, by using a predetermined management application installed in the portable device 3.

While a track assembly for a tracked vehicle according to a preferred embodiment of the present invention has been described in detail with reference to the attached drawings, an embodiment of the present invention is not necessarily limited to the above-described preferred embodiment. Rather, it will be apparent that various alterations and equivalents thereof can be made by a person of ordinary skill in the art. Therefore, the true scope of the present invention should be defined by the appended claims.

The invention claimed is:

1. A track assembly for a tracked vehicle, comprising:
   a support shaft disposed to be orthogonal to a traveling direction of a work body;
   a rotary roller fitted on the outer periphery of the support shaft and rotating while supporting the inner side of a chain belt;
   a first detection unit disposed between the support shaft and the rotary roller to measure either the number of rotations of the rotary roller or the acceleration thereof;
   a second detection unit for measuring the temperature of a lubricant applied between the support shaft and the rotary roller; and
   a third detection unit disposed on the rotary roller to measure a wear state of the rotary roller.

2. The track assembly of claim 1, further comprising a communication unit for communicating, to the outside, result values measured by the first to third detection units.

3. The track assembly of claim 2, wherein the communication unit comprises:
   a first communication line outputting result values from the first detection unit and the second detection unit; and
   a second communication line outputting a result value from the third detection unit.

4. The track assembly of claim 3, further comprising a reception unit for receiving the result values output from the communication unit via wireless communication.

5. The track assembly of claim 1, wherein the first detection unit comprises:
   a magnet that is attached to a part of the inner peripheral surface of the rotary roller exposed toward the support shaft and rotates in tandem with the rotary roller; and
   a hall sensor that is attached to the support shaft, corresponding to the rotational pathway of the magnet, and senses the magnetism of the magnet.

6. The track assembly of claim 1, wherein a bushing is interposed between the support shaft and the rotary roller, and the first detection unit comprises:
   a magnet that is attached to a part of the inner peripheral surface of the rotary roller not facing the bushing and rotates in tandem with the rotary roller; and
   a hall sensor that is attached to either the support shaft or the connecting collar, corresponding to the rotational pathway of the magnet, to sense the magnetism of the magnet.

7. The track assembly of claim 1, wherein a lubricant reservoir filled with a lubricant is further provided between the support shaft and the rotary roller, and the second detection unit is a temperature sensor that is disposed to be exposed to the lubricant reservoir.

8. The track assembly of claim 1, wherein the third detection unit is a contact sensor that is disposed to be hidden at a predetermined depth from the outer peripheral surface of the rotary roller.

9. The track assembly of claim 8, wherein the third detection unit is a conducting wire, which may be configured in such a way as to detect wear when the rotary roller wears out to the predetermined depth and wire breakage occurs.

10. The track assembly of claim 9, wherein a plurality of third detection units are provided at different depths from the outer peripheral surface of the rotary roller.

* * * * *